United States Patent [19]
Bryden et al.

[11] Patent Number: 5,139,348
[45] Date of Patent: Aug. 18, 1992

[54] BEARINGS

[75] Inventors: Donald J. S. Bryden, Stewarton; Peter T. Work; Hugh Mair, both of Kilmarnock; Roy K. McCulloch, Kilbirnie; Hugh M. Ross, Kilmarnock, all of Scotland

[73] Assignee: The Glacier Metal Company Limited, Northwood Hills, England

[21] Appl. No.: 661,184

[22] Filed: Feb. 27, 1991

[30] Foreign Application Priority Data

Mar. 2, 1990 [GB] United Kingdom ............... 9004717

[51] Int. Cl.⁵ .............................................. F16C 17/10
[52] U.S. Cl. ................................. 384/275; 384/294
[58] Field of Search ............ 384/275, 296, 288, 294, 384/295, 457

[56] References Cited

U.S. PATENT DOCUMENTS 3,361,502  1/1968  Weinkamer et al. ............ 384/294
3,713,714  1/1973  Hill et al. ............................ 384/294
4,714,356  12/1987 Damour et al. ..................... 384/275
4,989,998  2/1991  Willis et al. ........................ 384/275

Primary Examiner—Lenard A. Footland
Attorney, Agent, or Firm—William R. Hinds

[57] ABSTRACT

Flanged bearing bushes are described, the bush comprising a journal bearing element and a thrust flange bearing element on at least one end of the journal member, the journal bearing member having a reduced diameter portion and a shoulder formed on the outer diameter of the at least one end having the flange element wherein the flange element is received on the reduced diameter portion with the rear face of the flange supported by the shoulder on the journal bearing member end, and the flange member being retained on the journal bearing membered by deformation of material on the reduced diameter portion of the journal bearing member into recesses formed in the bore of the flange element.

7 Claims, 3 Drawing Sheets

BEARINGS

The present invention relates to a cylindrical bearing bush having a thrust flange member on at least one axial end of the bush.

Cylindrical bearing bushes are frequently wrapped from flat strip material, the strip material generally comprising a backing, such as steel, and having a lining of a bearing material thereon. Many applications require a bearing having a journal element and a thrust accepting element, usually called a thrust flange. Some lining materials have either insufficient ductility or adhesion to the backing to withstand the formation of an integral thrust flange on the bush end. In these circumstances a separate thrust flange member is frequently employed.

There is a general trend in industry towards reduction of the number of parts to be assembled and towards automatic assembly of parts. In the case of separate journal and thrust flange elements in a bush the problem of automatic assembly is greatly increased.

According to the present invention there is provided a flanged bearing bush comprising a journal bearing element and a thrust flange bearing element on at least one end of the journal member, the journal bearing member having a reduced diameter portion and a shoulder formed on the outer diameter of the at least one end having the flange element wherein the flange element is received on the reduced diameter portion with the rear face of the flange supported by the shoulder on the journal bearing member end, and the flange member being retained on the journal bearing member by deformation of material on the reduced diameter portion of the journal bearing member into recesses formed in the bore of the flange element.

Preferably, the recesses formed in the bore of the flange element have chamfers in the generally axial direction.

Preferably, there may be at least two recesses in the flange element.

The flange element may be of generally annular form, rectangular or be of any other desired polygonal shape. Shapes other than annular may be advantageous where additional security is desirable to prevent rotation of the bush in its housing.

Where the journal bearing member is formed from a material having a strong backing such as steel, for example, and a bearing lining material thereon, it is preferred that the reduced diameter portion and shoulder are formed in the backing material.

In order that the present invention may be more fully understood examples will now be described by way of illustration only with reference to the accompanying drawings of which:

Figure 1:
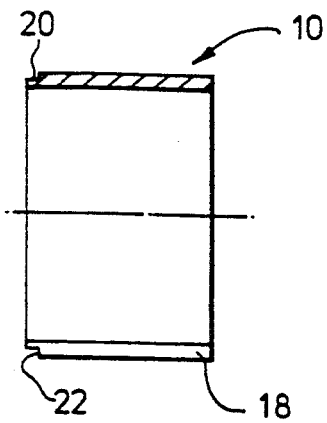
FIG. 1 shows an axial section through a journal bearing element of a bearing according to the present invention.
Figure 2:
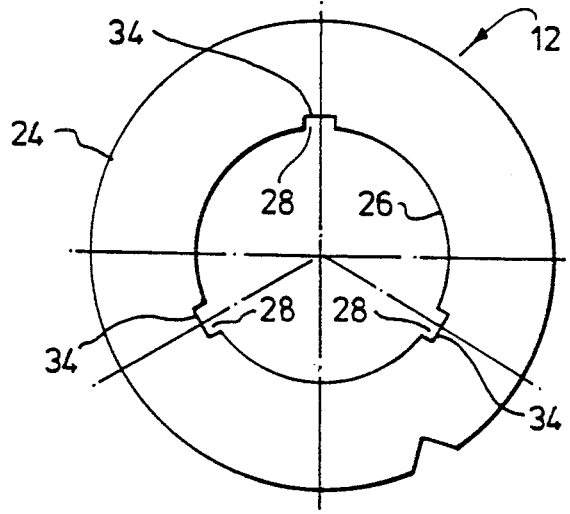
FIG. 2 shows an elevation of a flange member of a bearing according to the present invention.
Figure 3:
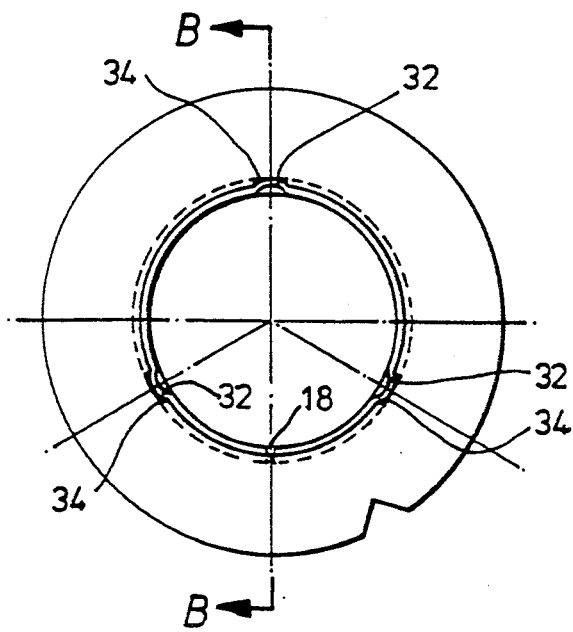
FIG. 3 shows an elevation of the elements of FIGS. 1 and 2 assembled.
Figure 4:
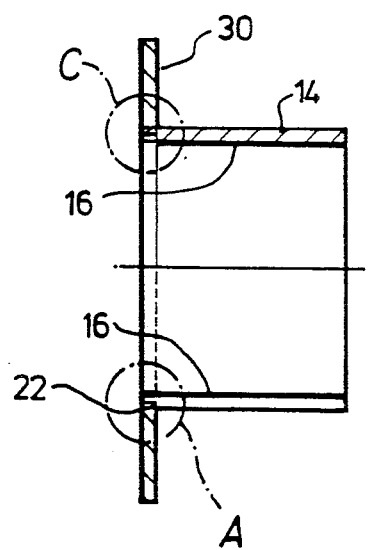
FIG. 4 shows an axial section through the bearing of FIG. 3 on the line BB.

Referring now to FIGS. 1 to 4 and where the same features have common reference numerals. A journal bearing element is shown at 10 and a thrust flange member at 12. The journal bearing element is formed from a flat strip of material comprising a steel backing 14 and a bearing material lining 16. After forming the journal bearing element 10 there is a split line remaining at 18. The steel backing 14 is machined away at the end to receive the flange element 12 to leave a portion 20 having a reduced outer diameter and a shoulder 22. The flange element is annular in form having outer and inner diameters 24 and 26 respectively. The inner diameter 26 corresponds with the reduced diameter portion 20 to allow the latter to fit within the flange inner diameter 26. The flange shown has three recesses 28 formed in the inner diameter. To assemble the bearing, the portion 20 is entered into the flange inner diameter 26 so that the rear face 30 of the flange is supported by the shoulder 22. Material 32 from the thinned portion 20 is then deformed into the recesses 28 also causing some consequential deformation of the edges 34 of the recesses to provide retention of the flange to the journal element.

Figure 5:
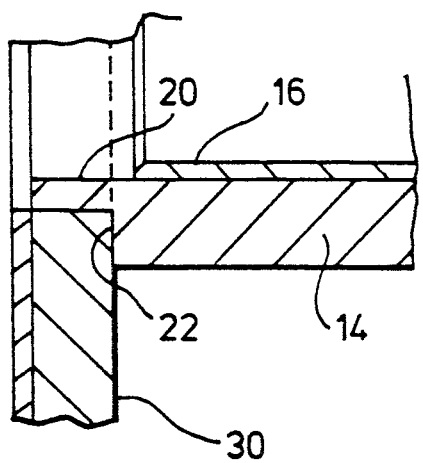
FIG. 5 shows an enlarged view of the detail "A" of FIG. 4.

In one embodiment the bearing (FIG. 5) lining material 16 may also be machined away in the area of the portion 20. It will be observed that the axial length of the thinned portion 20 is less than the total thickness of the flange element material.

Figure 6:
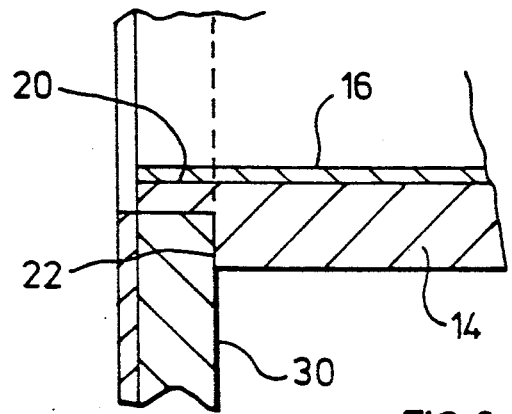
FIG. 6 shows an enlarged view of an alternative embodiment of the detail "A" of FIG. 4.

FIG. 6 shows lining material remaining in the journal element bore in the thinned portion.

Figure 7:
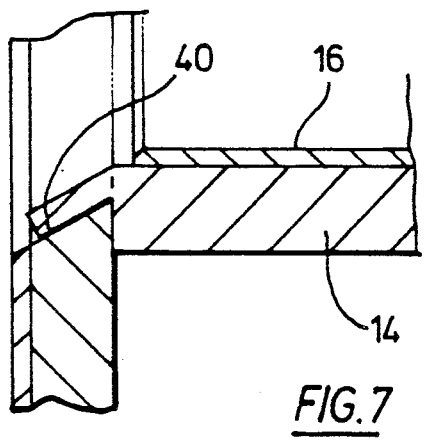
FIG. 7 shows an enlarged view of an alternative embodiment of the detail "C" of FIG. 4.

FIG. 7 shows a chamfer 40 on the lower edge 34 of a recess 28 to allow easier deformation of localised areas of the thinned portions 20.

Figure 8:
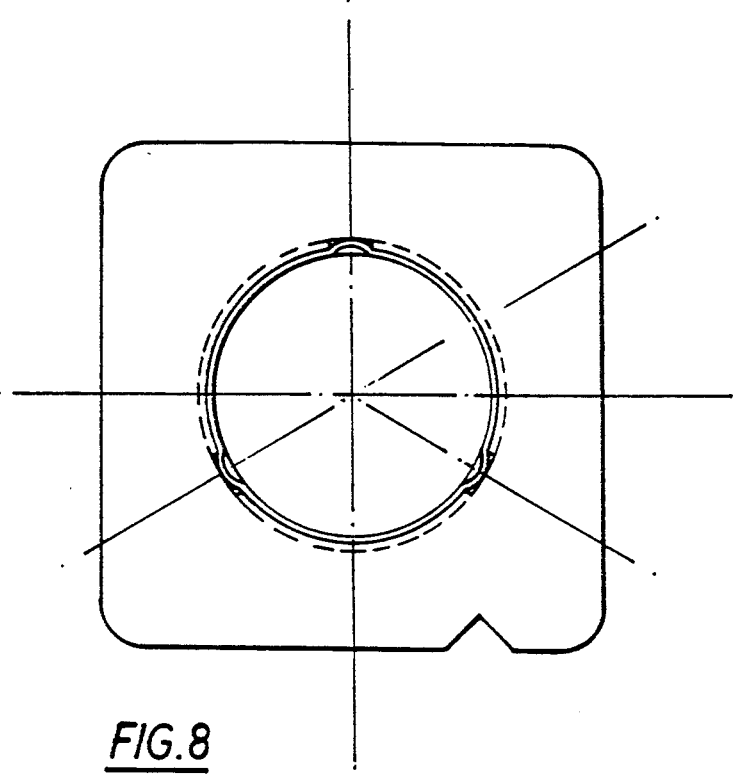
FIGS. 8 and 9 which show alternative shapes of flange element.
Figure 9:
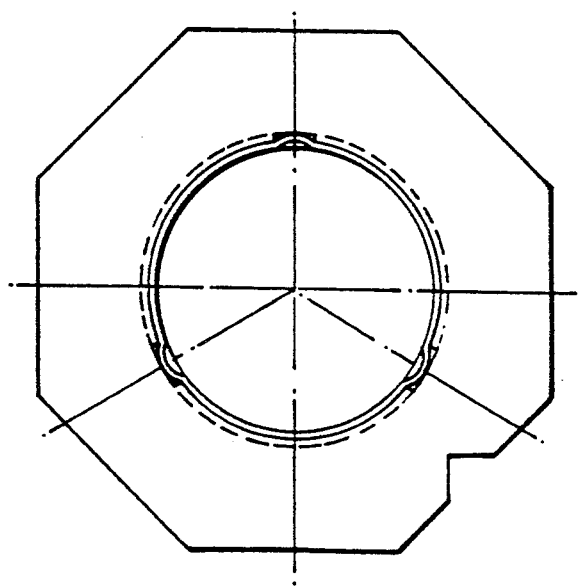

FIGS. 8 and 9 show other shapes for the flange element.

We claim:

1. A flanged bearing bush, the bearing bush comprising a journal bearing element and a thrust flange bearing element on at least one end of the journal member, the journal bearing member having a reduced diameter portion and a shoulder formed on the outer diameter of the at least one end having said flange element wherein said flange element is received on said reduced diameter portion with the rear face of the flange supported by said shoulder on said journal bearing member end, and said flange member being retained on said journal bearing member by deformation of material on said reduced diameter portion of said journal bearing member into recesses formed in the bore of the flange element.

2. A flanged bearing bush according to claim 1 wherein said recesses formed in the bore of the flange element have axially directed chamfers.

3. A flanged bearing bush according to claim 1 wherein there are at least two recesses formed in said bore of the flange element.

4. A flanged bearing bush according to claim 1 wherein said journal bearing element is formed from a material comprising a steel backing having a bearing material thereon.

5. A flanged bearing bush according to claim 4 wherein said reduced diameter portion and shoulder are formed in the steel backing material.

6. A flanged bearing bush according to claim 1 wherein said flange element is generally annular in shape.

7. A flanged bearing bush according to claim wherein said flange element is polygonal in shape.

* * * * *